United States Patent [19]
Georgopulos et al.

[11] Patent Number: 5,457,601
[45] Date of Patent: Oct. 10, 1995

[54] CREDIT CARD-SIZED MODEM WITH MODULAR DAA

[75] Inventors: Thomas Georgopulos, Bradenton, Fla.; Donald R. Laturell, Allentown, Pa.

[73] Assignee: AT&T Corp., Murray Hill, N.J.

[21] Appl. No.: 163,963

[22] Filed: Dec. 8, 1993

[51] Int. Cl.⁶ .................. H05K 7/10; H04B 1/38
[52] U.S. Cl. .............. 361/686; 361/737; 361/728; 439/59; 375/222
[58] Field of Search .............. 364/708.1; 439/59, 439/62, 377, 638, 928; 375/8; 361/684, 686, 737

[56] References Cited

U.S. PATENT DOCUMENTS

| | | | |
|---|---|---|---|
| 4,939,623 | 7/1990 | Equi et al. .................. | 361/686 X |
| 5,038,250 | 8/1991 | Uenaka et al. .................. | 361/737 |
| 5,161,169 | 11/1992 | Galano et al. .................. | 375/8 |

OTHER PUBLICATIONS

AST Computer advertisement, copyright 1992.

*Primary Examiner*—Michael W. Phillips

[57] ABSTRACT

A PCMCIA credit card sized modem for use with a portable computer includes a modular data access arrangement (DAA). The modem includes a substantially rectangular modem frame configured for mounting within the case of the portable computer. The frame has a first end configured to interface with the computer. The second end includes an interface opening through which an interface module is inserted. The interface module includes the DAA. The interface module may be quickly and easily replaced to meet varying international telecommunication requirements.

14 Claims, 4 Drawing Sheets

CREDIT CARD-SIZED MODEM WITH MODULAR DAA

BACKGROUND OF THE INVENTION

1. Field of the Invention

The present invention relates to credit card-sized electronic assemblies, and more particularly, to credit card-sized modems.

2. Related Art

Credit card-sized electronic assemblies are gaining importance with the expanding portable computer market. These small electronic assemblies, which are sometimes referred to as PCMCIA (Personal Computer Memory Card International Association) devices, plug into equipment such as a portable computer to provide additional features such as extra memory, extra programming, modem capabilities or facsimile capabilities. The PCMCIA devices slip into a port or opening in the computer which conforms to the physical standards set by the PCMCIA. A connector at one end of the PCMCIA device is used as an interface to the personal computer.

In the case of a PCMCIA modem or facsimile device, another connector, at the opposite end of the device, is used as an interface to external equipment such as a telecommunications network (telephone line) or a cellular communications interface circuit. The conventional credit card-sized modem includes modem circuitry and a DAA (data access arrangement) circuit. The DAA circuit provides an interface between the modem circuitry and a telephone line. For example, the DAA provides high voltage isolation, amplification, current limiting, impedance matching, and meets other electronic compatibility requirements.

While the PCMCIA has provided standards for the physical requirements of these credit card-sized modems, the telecommunication interface requirements of the DAA circuit is not governed by one international entity. As a consequence, countries have very differing requirements that the DAA circuit must meet. For example, the Federal Communications Commission (FCC) and Underwriter's Laboratories Inc. (UL) set standards which DAA circuits in the United States must meet. Other countries have differing standards.

It is desirable to produce a PCMCIA modem which may be used in different countries. However, a DAA assembly which meets the requirements of all countries is not currently available. One conventional solution to this problem is to use an external DAA circuit. As stated above, the PCMCIA modem includes an external connector for interfacing the modem to a telephone line. The DAA assembly is implemented as an integral part of the cable (known as a "bump" in the cable implementation) which connects the modem to the telephone line. Different cables, each including a different DAA circuit, could then be used to meet differing international requirements. Several cables could be carried, for example, in the carrying case of a portable computer. Other approaches have used an external DAA assembly which plugs into a connector at the back of the PCMCIA modem.

These conventional solutions include a variety of disadvantages. For example, with the bump in the cable approach, it is cumbersome for a user to carry several large cable/DAA assemblies. With the external DAA assembly which plugs into a connector at the back of the PCMCIA modem, the DAA assembly will protrude from the computer and must be removed before transporting the computer. What is needed is a PCMCIA modem which is easily adaptable to differing national telecommunication standards and which overcomes the limitations of conventional devices.

SUMMARY OF THE INVENTION

The invention is a credit card-sized modem assembly for use with a portable computer or other electronic equipment. The modem assembly includes a substantially rectangular modem frame configured in accordance with the PCMCIA standards to mount within the case of a portable computer. The frame includes a modem electronics region at a first end, and an interface electronics region at a second end. The modem electronics region is configured to receive a modem circuit. The interface electronics region is configured to receive an interface module or data access arrangement. The interface module is implemented as a removable module which may be inserted through an interface opening at the rear of the modem frame.

By implementing the interface electronics in a removable module, different interface modules may be quickly and efficiently interchanged to meet the varying country-specific interface specifications. The interface module is inserted completely into the PCMCIA modem frame. The modules are easily stored and interchanged.

In the preferred embodiment, the modem assembly includes a printed circuit board mounted in the modem frame. The printed circuit board primarily occupies the modem electronics region. The modem circuitry is mounted on the printed circuit board. The printed circuit board includes a substantially rectangular cutout portion at the interface electronics region. The cutout portion accepts entry of the interface module when the interface module is introduced into the interface electronics region through the interface opening. Electrical connection between the modem circuitry and the interface module is performed by an edge connector. The edge connector includes a first mating portion on the circuit board and a second mating portion on the interface module.

In the preferred embodiment, the modem assembly of the invention conforms to PCMCIA Type II configuration requirements. For example, the modem frame is 3.37 inches long by 2.126 inches wide. The interface opening at the rear end of the modem frame is approximately 1.5 inches wide and 0.10 inches high. In order for the interface module to be inserted through the interface opening, the total height must be less than 0.10 inches. To achieve this, the interface circuit is produced in a multi-chip module (MCM) having a maximum height of .08 inches. This ultra-low height is achieved using optical couplers and/or electrostatic coupling rather than a transformer for isolation.

The foregoing and other features and advantages of the invention will be apparent from the following, more particular description of a preferred embodiment to the invention, as illustrated in the accompanying drawings.

DETAILED DESCRIPTION OF THE PREFERRED EMBODIMENTS

The preferred embodiment of the invention is discussed in detail below. While specific configurations and arrangements are discussed, it should be understood that this is done for illustration purposes only. A person skilled in the art will recognize that other configurations and arrangements may be used without departing from the spirit and scope of the invention.

The preferred embodiment of the invention is now described with reference to the figures where like reference numbers indicate like elements. Also in the figures, the left most digit of each reference number corresponds to the figure in which the reference number is first used.

The invention is described in the embodiment of a PCM-CIA modem. It should be understood, however, that the term modem is used herein to encompass modems, facsimiles and similar telecommunication devices which require an interface to a telecommunications network (telephone line).

Figure 1:
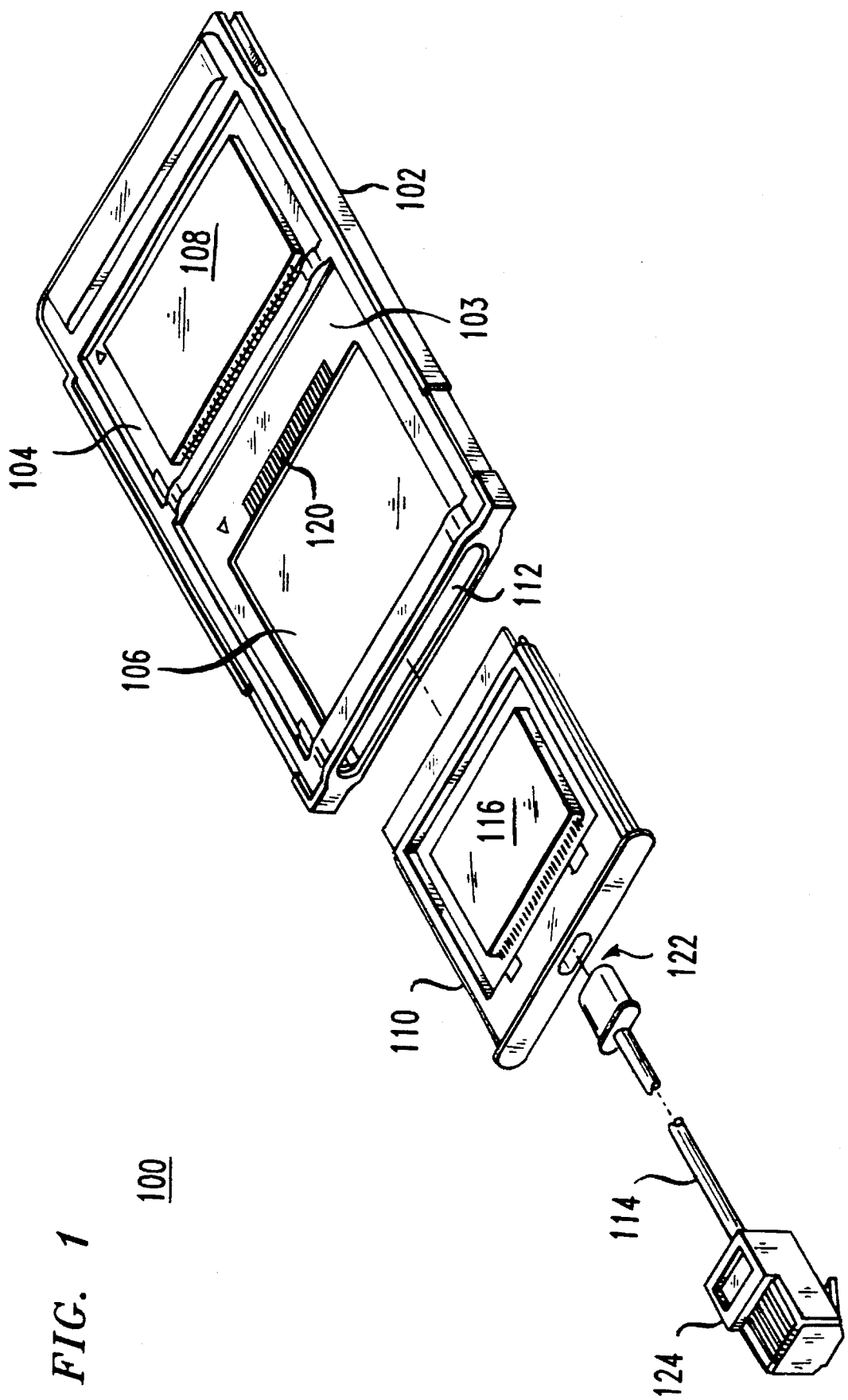
FIG. 1 is a bottom, perspective view of the modem assembly of the invention with the interface module removed from the modem frame.
Figure 2:
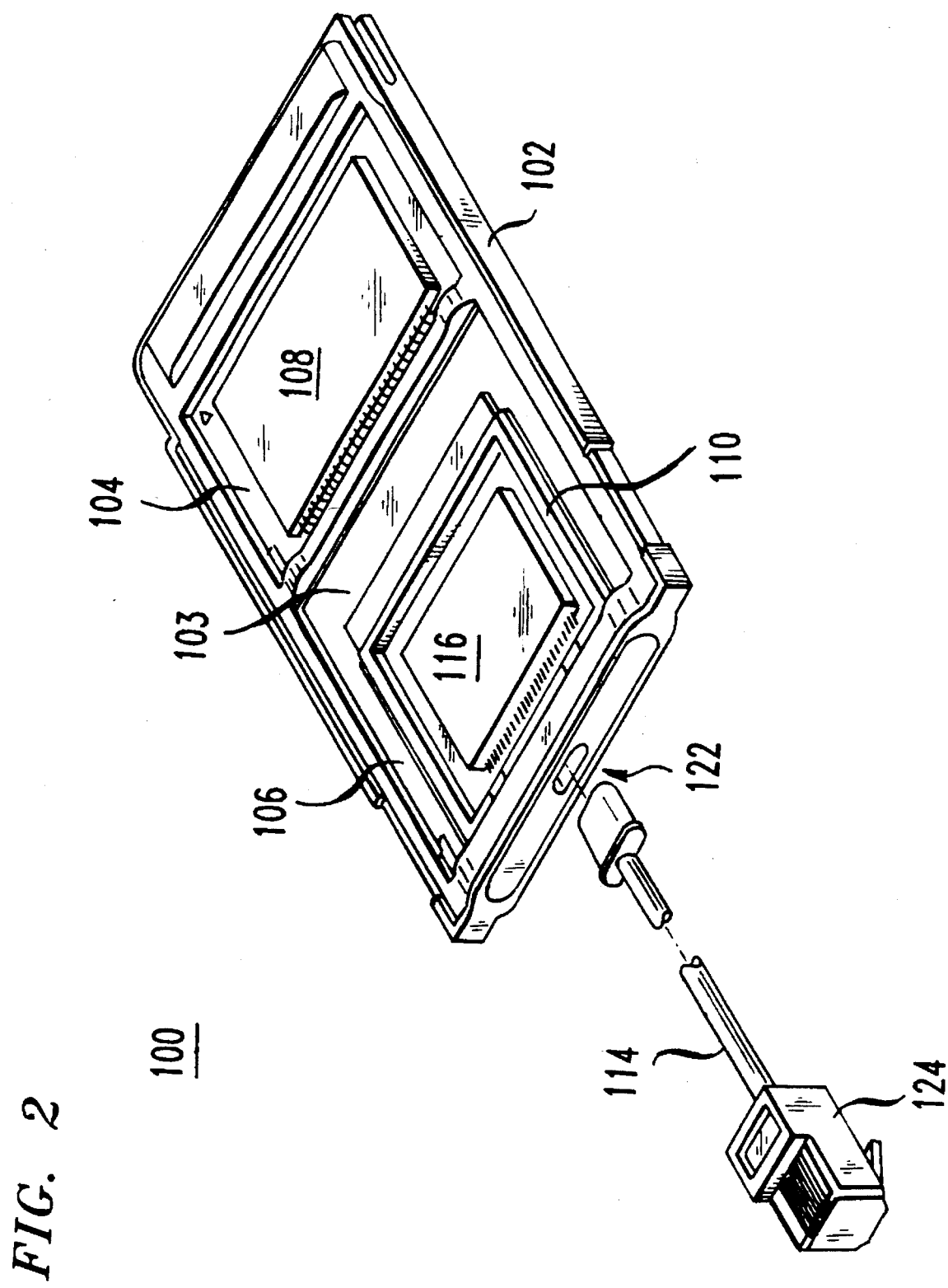
FIG. 2 is a bottom, perspective view of the modem assembly of the invention with the interface module positioned in the modem frame.

FIGS. 1 and 2 (bottom perspective views) show a credit card-sized, PCMCIA modem assembly 100 constructed in accordance with the invention. Modem assembly 100 includes a modem frame 102, a circuit board 103, a modem circuit 108 and an interface module 110. Circuit board 103 and modem frame 102 define a modem electronics region 104 and an interface electronics region 106. Modem circuit 108 is disposed in modem electronics region 104. Interface module 110 is configured for removable mounting in interface electronics region 106 through interface opening 112 in modem frame 102.

Modem circuit 108 includes electronic circuitry required to interface a computer using binary digital signals to a telephone line using audio frequency signals. Modem circuits are well known in the art, and construction and implementation of modem circuit 108 will be apparent to a person skilled in the relevant art. An example of a suitable modem circuit is the AT&T DSP1630 and INTFC devices, which together contain all of the required modem circuitry. These devices are commercially available from American Telephone and Telegraph Company, New York, N.Y.

Interface module 110 includes an interface circuit 116. In the preferred embodiment, interface circuit 116 is a transformerless data access arrangement (TDAA). The TDAA may be implemented, for example, as a hybrid circuit in accordance with the teachings of commonly owned U.S. Patent Application Serial No. 07/888,075, filed May 26, 1992, titled "An Improved Transformer-Less Hybrid Circuit," or in accordance with the teachings of U.S. Pat. No. 4,056,719 to Waaben. The relevant teachings of each of these patent documents are incorporated herein by reference.

Figure 3:
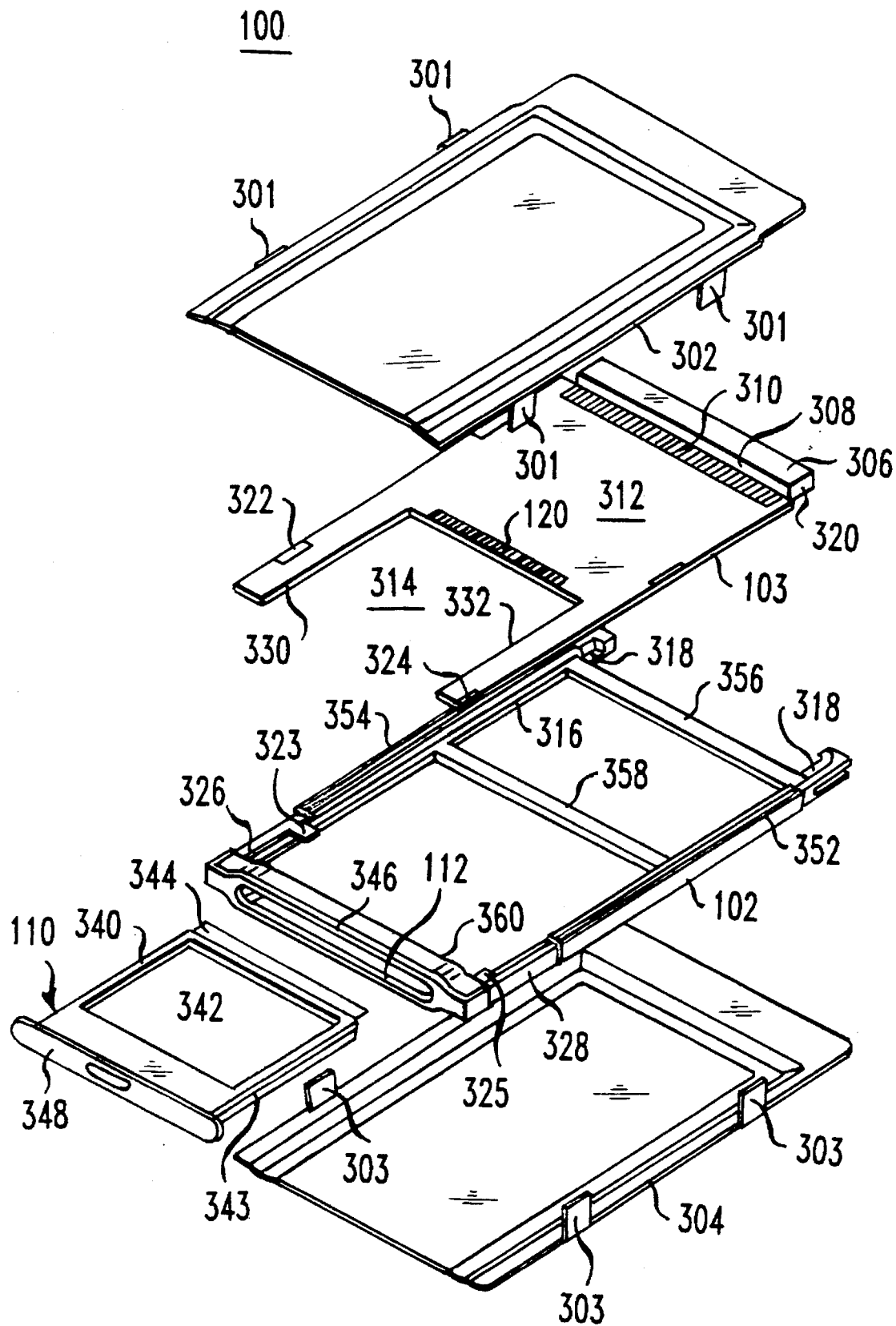
FIG. 3 is an exploded, perspective view of the modem assembly of the invention.

Modem circuit 108 interfaces with a host computer (e.g., a notebook computer into which modem assembly 100 is inserted) via a multi-pin connector 306 (shown in FIG. 3). Interface circuit 116 communicates with modem circuit 108 via an edge connector 344 (shown in FIGS. 3 and 4) and a plurality of conductive contacts 120 on circuit board 103. Interface circuit 116 interfaces with a telephone line (not shown) via a cable 114 having a two pin connector 122 for connecting to interface circuit 116 and a modular plug 124 for connecting to the telephone line.

FIG. 1 illustrates modem assembly 100 with interface module 110 removed. FIG. 2 illustrates modem assembly 100 with interface module 110 positioned in interface electronics region 106.

The structure and operation of modem assembly 100 is described in greater detail with references to FIG. 3. FIG. 3 is an exploded perspective view of modem assembly 100 illustrating circuit board 103 removed from frame 102. An upper cover 302 and a lower cover 304 (not shown in FIGS. 1 or 2) are also shown in FIG. 3. Upper cover 302 includes four tabs 301. Similarly, lower cover 304 includes four tabs 303. When modem assembly 100 is fully assembled, tabs 301,303 are bent over to hold the modem assembly together.

Modem frame 102 includes lateral rails 352 and 354 and transverse portions 356, 358 and 360. Interface opening 112 is formed in transverse portion 360.

Printed circuit board 103 includes an electrical connector 306 having a plurality of conductors 308. Each conductor 308 is electrically connected to a conductor 310 of printed circuit board 103. Connector 306 provides electrical communications between modem circuit 108 and the computer or other electronic assembly in which modem assembly 100 is inserted.

Printed circuit board 103 includes a body portion 312 defining a substantially rectangular cutout 314. Frame 102 is configured to receive printed circuit board 103 and connector 306. A ridge 316 extends around the perimeter of the lower inner boarder of modem frame 102. Ridge 316 supports printed circuit board 103 when it is inserted into modem frame 102. Grooves 318 are adapted to receive tabs 320 of connector 306.

Circuit board 103 further includes lateral edges 330,332 at cutout portion 314. Edges 330,332 act as guide rails when interface module 110 is inserted into cutout portion 3 14. Edge 332 mates with a groove or track 343 in a side portion of interface module 110. Edge 330 mates with a groove or track (not shown) in an opposite side portion of interface module 110.

When printed circuit board 103 is positioned in modem frame 102, contacts 322,324 of printed circuit board 103 make electrical connection with contacts 323,325, respectively, of modem frame 102. Contacts 323,325 extend to outer portions 326,328, respectively, which are configured to make electrical connection with corresponding conductors within the computer or other electronic assembly. These contacts are typically used to provide a shielding ground to printed circuit board 103.

Interface module 110 includes an interface module frame 340, a printed circuit board 342, and an edge connector 344. In the preferred embodiment, edge connector 344 is an integral part of module frame 340. Interface circuit 116 (out of view in FIG. 3) is mounted on the underside of printed circuit board 342. Interface circuit 116 is electrically connected to connector 344 via printed circuit board 342.

Interface module frame 340 includes a face portion 348 of a size slightly greater than interface opening 112. The remaining portion of interface frame 340 is dimensioned to fit through interface opening 112. When interface module 110 is fully inserted into interface opening 112, face portion 348 of interface module 110 mates with a recessed portion 346 surrounding interface opening 112. In this fully inserted position, edge connector 344 mates with contacts 120 of circuit board 103.

Figure 4:
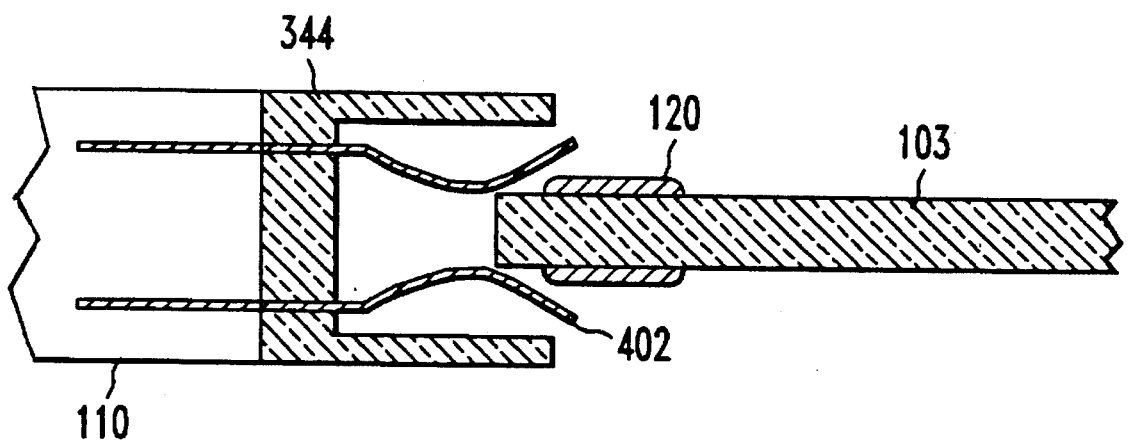
FIG. 4 illustrates an example edge connection between the interface module and the printed circuit board of the modem assembly.

FIG. 4 illustrates an example interconnection between interface module 110 and printed circuit board 103. In this example, edge connector 344 includes spring-type connector contacts 402 which are configured to contact conductors 120 of printed circuit board 103 when circuit board 103 is inserted into connector 344. Various other implementations of the interconnection between interface module 110 and printed circuit board 103, will be apparent to a person skilled in the relevant art.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A credit card-sized modem assembly for a portable computer equipment, comprising:

a frame assembly configured for mounting within the case of the portable computer equipment, said frame assembly having a first end configured to interface with the computer equipment and a second end configured as an interface module receiving end;

a modem circuit disposed in said frame assembly at said first end; and an interface module including an interface circuit for interfacing said modem circuit with a telephone line and means for connecting said interface circuit to said telephone line, said interface module being configured for removable mounting in said frame assembly at said interface module receiving end.

2. The modem assembly of claim 1, wherein said frame assembly comprises:

a substantially rectangular modem frame defining an interface opening at said interface module receiving end of said frame assembly; and a printed circuit board disposed in said modem frame, wherein said modem circuit is mounted on said printed circuit board at said first end of said frame assembly, said printed circuit board defining a cutout portion at said second end of said frame assembly in alignment with said interface opening, said cutout portion being configured to receive said interface module via said interface opening.

3. The modem assembly of claim 2, wherein said interface module comprises:

a substantially rectangular interface module frame having a first end and a second end connected by two side frame portions, said second end including a face plate having a size not less than the size of said interface opening in said modem frame, each of said side frame portions including a longitudinal groove on an outer lateral surface configured to mate with an edge of said printed circuit board at said cutout portion when said interface module is inserted into said frame assembly through said interface opening, said face plate limiting the insertion of said interface module into said frame assembly to a point where said face plate is flush with a front face of said modem frame;

a second printed circuit board positioned in said interface module frame; and said interface circuit disposed on said second printed circuit board.

4. The modem assembly of claim 3, further comprising:

connecting means for providing a plurality of electrical connections between said modem circuit and said interface circuit when said interface module is positioned in said modem frame, said connecting means having a first mating portion and a second mating portion, said first mating portion being disposed on said printed circuit board adjacent said cutout portion and being electrically connected to said modem circuit, said second mating portion being connected to said interface module, said first and second mating portions being coupled together when said interface module is positioned in said modem frame.

5. A modem assembly for use with a portable computer equipment, comprising:

a substantially rectangular modem frame configured for mounting within the case of the portable computer equipment, said modem frame having a first end and a second end, a first portion adjacent said fast end defines a modem electronics region and a second portion adjacent said second end defines an interface module receiving region, said second end including an interface opening;

a modem circuit disposed in said modem electronics region; and an interface module including an interface circuit for interfacing said modem circuit with a telecommunications network and means for providing a connection between said interface circuit and said telecommunications network, said interface module configured for removable mounting in said interface module receiving region of said modem frame through said interface open.

6. The modem assembly of claim 5, wherein said modem frame comprises a length not greater than 3.37 inches, a width not greater than 2.13 inches and a height not greater than 0.196 inches.

7. The modem assembly of claim 6, wherein said interface module comprises a height not greater than 0.10 inches.

8. The modem assembly of claim 5, further comprising a printed circuit board mounted in said modem frame and primarily occupying said modem electronics region, said printed circuit board having a substantially rectangular cutout portion at said interface module receiving region, said cutout portion being open at an end adjacent said interface opening to accept entry of said interface module into said cutout portion when said interface module is introduced into said interface module receiving region through said interface opening.

9. The modem assembly of claim 8, further comprising:

connecting means for providing a plurality of electrical connections between said modem circuit and said interface circuit, said connecting means having a first mating portion and a second mating portion, said first mating portion being disposed at a central portion of said printed circuit board between said modem electronics region and said interface electronics region and being electrically connected to said modem circuit, said second mating portion being connected to said interface module and electrically connected to said interface circuit, said first and second mating portions being coupled together when said interface module is positioned in said interface module receiving region of said modem frame.

10. The modem assembly of claim 9, wherein said first mating portion of said edge connector comprises a plurality of conductive pads disposed on said printed circuit board between said cutout portion and said modem electronics region.

11. The modem assembly of claim 10, wherein said interface module comprises:

a substantially rectangular interface module frame having a first end and a second end connected by two side frame portions, said second end including a face plate having a size not less than the size of said interface opening in said modem frame, each of said side frame portions including a longitudinal groove on an outer lateral surface configured to mate with an edge of said circuit board at said cutout portion when said interface module is inserted into said interface module receiving region through said interface opening, said face plate limiting the insertion of said interface module into said modem frame to a point where said face plate is flush with a front face of said modem frame;

a second printed circuit board positioned in said interface module frame; and said interface circuit disposed on said second printed circuit board, wherein said second mating portion of said edge connector is electrically connected to said interface circuit and is disposed at said first end of said interface module frame.

12. The modem assembly of claim 11, wherein said modem frame comprises a length not greater than 3.37 inches, a width not greater than 2.13 inches and a height not greater than 0.196 inches.

13. The modem assembly of claim 12, wherein said interface module comprises a height not greater than 0.10 inches.

14. A modem assembly for interfacing between a portable computer equipment and a telecommunications system, comprising:

a substantially rectangular, credit card-sized modem frame configured for mounting within a case of the portable computer equipment, said modem frame including a first end having computer interface means for interfacing with the portable computer equipment, and a second end being configured as an interface module receiving end;

a printed circuit board mounted within said modem frame, said printed circuit board having a modem region adjacent said fast end, a cutout region adjacent said second end, and a connector region disposed between said modem region and said cutout region;

a modem circuit mounted in said modem region and electrically connected to said computer interface means;

an interface module having an interface circuit for interfacing said modem circuit with the telecommunications system and means for providing a connection between said interface circuit and the telecommunications system, said interface module being configured for receipt by said interface module receiving end and being configured to removably mount in said cutout region of said printed circuit board; and connector means for electrically connecting said interface circuit with said modem circuit, said connector means having a first mating portion and a second mating portion, said first mating portion disposed on said printed circuit board in said connector region and electrically connected to said modem circuit, said second mating portion disposed on said interface module and electrically connected to said interface circuit, said first and second mating portions being coupled together when said interface module is positioned in said modem frame.

* * * * *